June 30, 1970     D. P. HEMPHILL     3,517,400
APPARATUS FOR MAKING UNDERWATER PIPELINES
Filed April 10, 1968
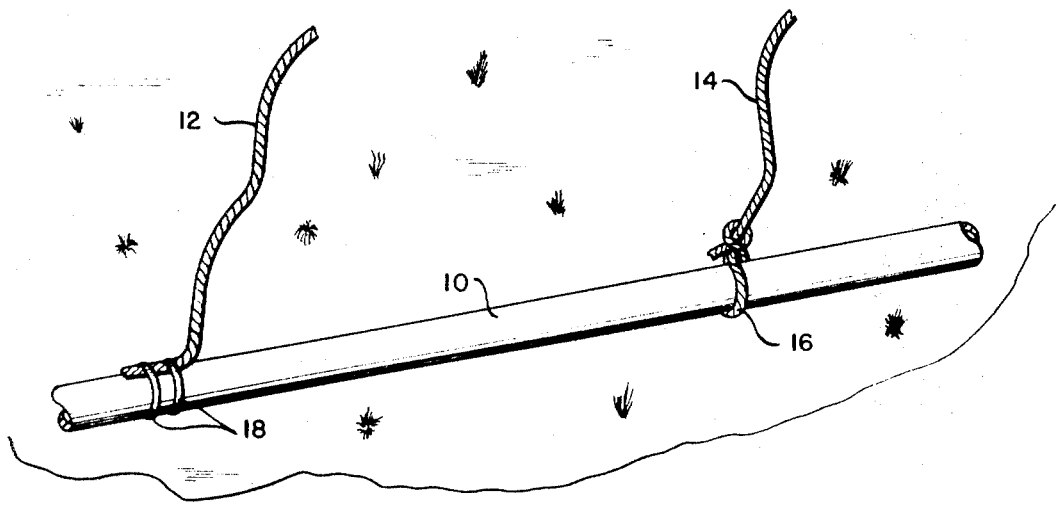
FIG. 1
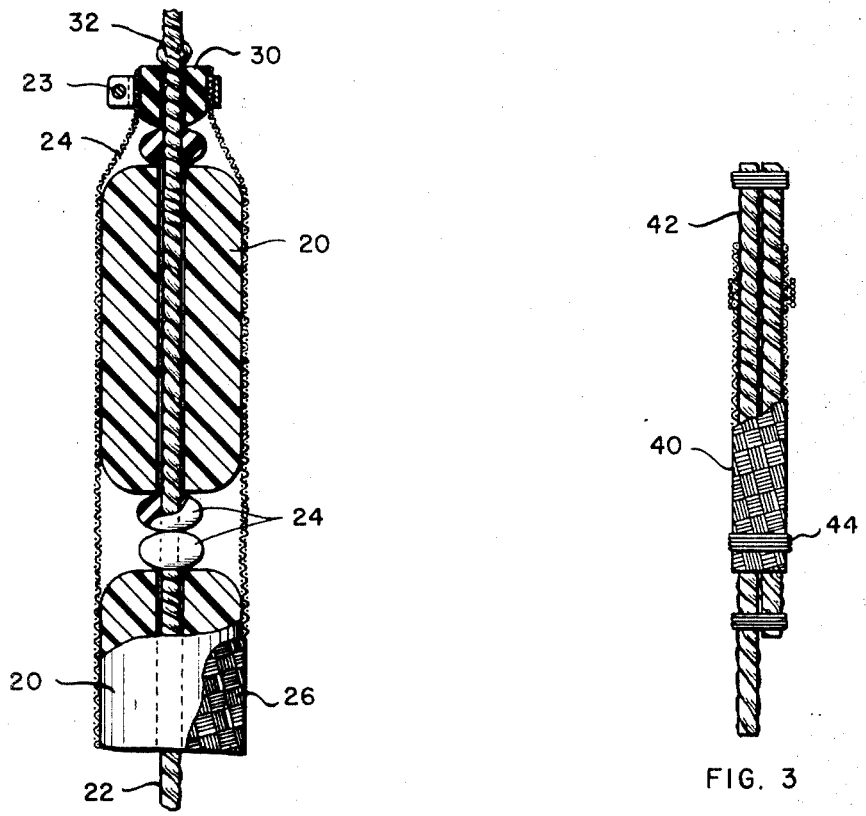
FIG. 2
FIG. 3
INVENTOR:
D.P. HEMPHILL
BY: A. H. McCarthy
HIS AGENT

United States Patent Office 3,517,400
Patented June 30, 1970

3,517,400
APPARATUS FOR MARKING UNDERWATER PIPELINES
Dean P. Hemphill, Houston, Tex., assignor to Shell Oil Company, New York, N.Y., a corporation of Delaware
Filed Apr. 10, 1968, Ser. No. 720,246
Int. Cl. B63b 21/52
U.S. Cl. 9—8                    5 Claims

ABSTRACT OF THE DISCLOSURE

An apparatus for marking underwater locations for detection by sonar consisting of a strong buoyant rope, such as polypropylene sheathed in a multi-surface acoustic reflector.

BACKGROUND OF THE INVENTION

The present invention relates to sonar targets, and more particularly, to durable, easily handled, inexpensive salt water resistant sonar targets for marking underwater pipelines or other objects.

For example, in the past few years, the petroleum industry has resorted to underwater pipelines to transport the ever-increasing oil production from off-shore facilities. In connection with the use of underwater pipelines, several problems in their maintenance have developed whereby it becomes necessary to relocate the pipelines on the bottom of the ocean floor. In practice, it has been very difficult to locate pipelines or small objects on the sea floor using sonar, even with such recent developments as the side scanning sonar. On occasion, crude deflectors such as oil drums suspended above an object have been used, with limited success.

But several problems are associated with marking underwater objects in this way. First of all, salt water is a very corrosive environment; and it was found that the oil drums or the anchoring cables had to be frequently replaced. Secondly, reflectors or buoys of this type used beneath the water surface must be strong enough to resist collapse from the external or ambient pressure, or they must be pressurized internally to overcome the effects of the ambient pressure, or they must be open to this ambient pressure with resulting problems in placement and maintenance. Thirdly, the sonar reflections from targets even as large as oil drums were not strong and if the angle with which the incident sonar beam hit the target were more than a few degrees from the normal, the reflections were nearly zero. Fourthly, targets with reflecting surfaces of sufficient size to give a good reflected signal were bulky, hard to handle under water, and difficult to anchor to the pipeline. Finally, large surface, anchored targets had tendencies to become tangled with trawls, fishing equipment, anchors, etc. It is therefore an object of this invention to provide a sonar target for underwater use capable of returning strong reflection signals.

Another object of the invention is to provide sonar targets for underwater pipelines capable of returning strong reflection signals when the angle with which the sonar beam hits the target is relatively large.

Another object of the invention is to provide a highly reflective sonar target for underwater pipelines that is small, light, and easy to handle.

Another object of the invention is to provide a sonar target for underwater pipelines that will resist entanglement and at the same time resist burying.

Finally it is an object of the present invention to provide a permanent sonar target capable of withstanding the ravages of salt water for long periods of time.

SUMMARY OF THE INVENTION

In accordance with one embodiment of the invention, the sonar target, consisting of a flexible body element attached to the underwater pipeline, is sheathed in a multi-surfaced acoustic reflector and the body element-reflector assembly is made buoyant by a buoyancy member associated therewith.

BRIEF DESCRIPTION OF THE DRAWING

Further objects and a better understanding of this invention can be had from the following detailed description taken in conjunction with the drawing in which:

FIG. 1 illustrates the sonar target of this invention attached to an underwater pipeline.

FIG. 2 shows a vertical section of one embodiment of the invention.

FIG. 3 shows another embodiment of the invention.

One of the key features of the present invention is based upon the discovery that multiple strands of small metal wire wound together make an excellent sonar reflector. A small diameter buoyant rope with a sheath in the form of a braided metallic sleeve provides an outstanding sonar target when much larger reflection surfaces such as an oil drum were inadequate. It has been found that target configurations in the neighborhood of 10 feet long and ½ inch in diameter provide outstanding reflections with incident angles as much as 28° off the normal. In addition, it has been found that this configuration uniquely combines several other advantages that enhance its underwater performance. For instance, it is light and easy to handle both on the surface and underwater; its flexibility and substantially uniform buoyancy over its entire length make it tangle resistant; and it tends to maintain itself in a substantially vertical position thereby improving its detectability and resistance to burying.

An added advantage resulting from the small size and relative permanence of the target is that code clusters of the targets may be used to mark specific locations on the pipeline such as a valve.

DESCRIPTION OF PREFERRED EMBODIMENTS

Referring now to FIG. 1, there is shown a pipeline 10 lying on the floor of the ocean. Attached thereto are sonar targets 12 and 14. The targets may be located in clusters along the pipe with each cluster arranged according to a code so that a special point on the pipeline, for example, a valve, could be specifically detected. FIG. 2 shows the internal construction of a segment of one embodiment of the target. There, floats 20 which for example may be made of plastic foam or hollow glass or fiberglass spheres or cylinders are positioned along a body element or strength member 22 by means of spacers or knots 24. Strength member 22 is preferably made of a synthetic fiber material that is resistant to corrosion by salt water. Such materials are sold under the trade names Dacron and nylon. A wire mesh or braided metallic wire sleeve 26 is positioned over the float-strength member configuration 20–22 and may be attached at either end preferably by clamps 23 which act to firmly attach it to a plug 30 that may in turn be positioned on strength member 22 by a simple knot 32 or other suitable connector means. Sleeve 26 is preferably made of braided wire as used in the electrical industry for conductor shields. For example, Belden No. 8658 conductor shield manufactured by Belden Manufacturing Company, of Chicago, Ill. works well and can be had in sizes that will fit over 2, 2½, or 3 inch diameter floats. Sleeve 26 is preferably made of a corrosion-resistant material such as stainless steel. Such multi-strand surfaces have been found to provide an excellent reflector surface for sonar over a wide range of incident angles.

FIG. 3 shows a segment of an alternative embodiment. There a multi-surface metal reflector 40 is placed over a buoyant rope or ropes 42 and clamped thereto with a suitable clamp 44. Two ropes are illustrated in FIG. 3;

however, the number of ropes is unimportant. It is only necessary that the rope 42 be sufficiently buoyant to insure that the target be substantially vertical in the water. In this case rope 42, which may, for example, be made of polypropylene, is both the buoyancy and strength member. Attachment of the target to the pipeline can be simply accomplished by several means such as: knotting the strength member around the pipe as shown at 16 in FIG. 1, stainless steel clamps as shown at 18 in FIG. 1, or shrink-on polyethylene plastic sleeves.

While the present invention has been discussed in connection with the problems of underwater pipelines for which it is primarily intended, it is understood that the concepts and apparatus of the invention are equally applicable to marking any underwater object or location which must later be relocated and/or identified.

I claim as my invention:

1. An apparatus for marking locations on the floor of a body of water for sonar detection comprising:
    a strength member having one end firmly fixed in position near the floor at the location to be marked, said strength member being of such a length as to terminate a substantial distance below the surface of said body of water where extending upwardly;
    a multi-surface acoustic signal reflector surrounding said strength member and in contact with the water, and
    a buoyancy member associated with said strength member and said reflector whereby said apparatus is suspended in the water.

2. The apparatus of claim 1 wherein said multi-surface acoustic signal reflector consists of a braided wire sleeve.

3. The apparatus of claim 1 wherein said buoyancy member and said strength member are a unitary element.

4. The apparatus of claim 1 wherein said buoyancy and said strength members are a polypropylene rope.

5. The apparatus of claim 2 wherein said buoyancy member comprises a plurality of floats spaced from one another along said strength member.

References Cited

UNITED STATES PATENTS

| | | | |
|---|---|---|---|
| 2,716,758 | 9/1955 | Hajecate | 9—8 |
| 3,309,649 | 3/1967 | Ballard et al. | 9—8 X |
| 3,397,413 | 8/1968 | Houtswa | 9—8 |

FOREIGN PATENTS 891,304  3/1962  Great Britain.

OTHER REFERENCES

Manmade Fiber Ropes in New York Harbor, Modern Textiles Magazine; vol. 42, No. 8; August 1961; p. 38, Rayon Publishing Corp., New York, N.Y.

TRYGVE M. BLIX, Primary Examiner

J. L. FORMAN, Assistant Examiner